April 6, 1954

O. H. BOND ET AL

2,674,010

COMBINED HARVESTER AND DECORTICATOR

Filed Aug. 21, 1947

INVENTORS
W. E. WRIGHT
O. H. BOND

BY *A. Yates Dowell*

ATTORNEY

April 6, 1954

O. H. BOND ET AL 2,674,010

COMBINED HARVESTER AND DECORTICATOR

Filed Aug. 21, 1947

INVENTORS
W. E. WRIGHT
O. H. BOND
BY A. Yates Dowell
ATTORNEY

April 6, 1954 — O. H. BOND ET AL — 2,674,010
COMBINED HARVESTER AND DECORTICATOR
Filed Aug. 21, 1947 — 6 Sheets-Sheet 3

INVENTORS
W. E. WRIGHT
O. H. BOND
BY A. Yates Dowell
ATTORNEY

April 6, 1954  O. H. BOND ET AL  2,674,010
COMBINED HARVESTER AND DECORTICATOR
Filed Aug. 21, 1947  6 Sheets-Sheet 4

INVENTORS
W. E. WRIGHT
O. H. BOND
BY A. Yates Dowell
ATTORNEY

April 6, 1954

O. H. BOND ET AL

2,674,010

COMBINED HARVESTER AND DECORTICATOR

Filed Aug. 21, 1947

INVENTORS
W. E. WRIGHT
O. H. BOND

BY *A. Yates Dowell*

ATTORNEY

April 6, 1954  O. H. BOND ET AL  2,674,010
COMBINED HARVESTER AND DECORTICATOR
Filed Aug. 21, 1947  6 Sheets-Sheet 6

INVENTORS
W. E. WRIGHT
O. H. BOND
BY A. Yates Dowell
ATTORNEY

Patented Apr. 6, 1954

2,674,010

UNITED STATES PATENT OFFICE 2,674,010

COMBINED HARVESTER AND DECORTICATOR

Orson H. Bond, Moore Haven, and William E. Wright, West Palm Beach, Fla., assignors to Sea Island Mills, Inc., New York, N. Y.

Application August 21, 1947, Serial No. 769,840

7 Claims. (Cl. 19—12)

This invention relates to improvements in the production of vegetable fiber and more particularly to an improved method and apparatus for harvesting ramie and for preparing fiber therefrom of high commercial quality.

The use of ramie fiber apparently originated in the Orient and hand cleaned fiber known commercially as "China grass" was imported into this country for many years up until the time such imports were cut off by military activities in China. This hand cleaned Chinese fiber was not sufficiently free of bark and other parts of the plants and was not received in sufficient quantity to achieve wide use in the textile industry. It has been known to Oriental peoples, however, since antiquity as a source of fiber for domestic cloth.

Some prior work has been done in an attempt to design a successful decorticating apparatus but the majority of these have been designed as general purpose machines and consequently do not operate satisfactorily with ramie, which has peculiar properties requiring specially designed machines. For instance, ramie cannot be fed through a decorticating apparatus by normal feeding rolls since the ramie will wind up on the rolls and will not follow a straight path therebetween. This property therefore requires that some sort of gripping means which will pull the ramie through the machine must be employed. Also, ramie fiber must be processed immediately after cutting the plants, as a fiber destroying ferment apparently of enzymic character begins soon after the plants are cut and the organic gums and resins in the plant also harden and become comparatively insoluble. This requires that the ramie decorticating apparatus be used at the location at which the plants are grown.

As ramie is a tropical plant growing best in damp or swampy soil, the decorticating apparatus must be used in locations where very little skilled labor is available and where it is subject to adverse climatic conditions. To meet these conditions the apparatus must be reasonably easy to transport and assemble, must be as completely automatic in operation as possible and must have little tendency to get out of order. Further in view of the necessity of cleaning the fiber immediately after cutting, it is highly desirable that a harvesting apparatus be combined with the decorticator.

Heretofore, it has apparently been impractical to combine a harvester and decorticator in one unitary apparatus probably because of the heavy weight of previous decorticators and the fact that due to this weight these decorticators could not be designed to incorporate harvesting apparatus and still be light enough to move over damp or swampy ground.

As the usable dried fiber amounts to only about six percent of the green weight of the stalks, any material loss of fiber is extremely important from a commercial viewpoint and consequently the decorticating apparatus must be designed to adequately clean the fiber and still not lose any appreciable amount thereof.

After the fiber has been cleaned and dried it is put through a degumming process which dissolves the organic gums and resins which are present with the fiber. The fibers are then separated and carded according to usual textile methods and may be subsequently bleached, dyed, spun and woven as may be desired.

In order that the fiber separating and carding apparatus may operate successfully on the long staple fibers which the ramie plant produces, it is desirable that the fibers should be substantially parallel in relatively straight ribbons at the conclusion of the decorticating process and it is also highly desirable that these ribbons should contain substantially all of the usable fiber in the stalks.

It is therefore among the objects of the present invention to provide improved harvesting and decorticating apparatus especially adapted to cleaning ramie fiber which will produce relatively straight, thoroughly cleaned ribbons of substantially parallel fibers without material loss of commercially usable fibers.

It is a further object of this invention to provide a combined harvester and decorticator of relatively light weight which may be easily transported over damp or swampy ground and which is provided with its own power plant for operating the harvesting and decorticating apparatus.

It is a further object of this invention to provide a combined harvesting and decorticating apparatus for ramie having means to cut and deliver the ramie stalks to the decorticating apparatus with the result that the ramie is cleaned immediately after cutting.

It is a further object of this invention to provide a decorticating apparatus for ramie having means to grip the stalk and feed the ramie, top end first, to crushing or scraping rolls at substantially right angles thereto and having additional means to grip the stalks at another location and to feed the butt end thereof to a second set of crushing or scraping rolls.

It is a further object of this invention to provide a decorticating apparatus having feeding means which advances the top end of the stalk toward the scraping rolls at a faster rate than the butt end.

It is a still further object of this invention to provide a decorticating apparatus for ramie having a specially designed means for gripping the stalk without injury thereto and feeding the stalk to the scraping rolls.

It is a further object of this invention to provide a decorticating apparatus for ramie having crushing or scraping rolls designed to adequately clean the ramie fiber and at the same time to prevent excessive jarring action and to keep vibration at a minimum.

It is a further object of this invention to provide an improved method of harvesting and decorticating ramie which results in adequately cleaned fibers comprising a substantial part of the fibers originally present in the plant.

Further objects and advantages of the invention will be apparent from the following description taken in conjunction with the accompanying drawings, wherein:

Fig. 13, a perspective view to an enlarged scale and showing the details of the gripping chains of Fig. 6;

Fig. 14, an elevational view in section taken on the line 14—14 of Fig. 13;

Fig. 15, a side elevational view of the gripping chains of Fig. 6 and showing in detail the means for holding these chains in engagement to grip ramie stalks therebetween; and, Fig. 16, an elevational view partially in section taken on the line 16—16 of Fig. 15.

Figure 1:
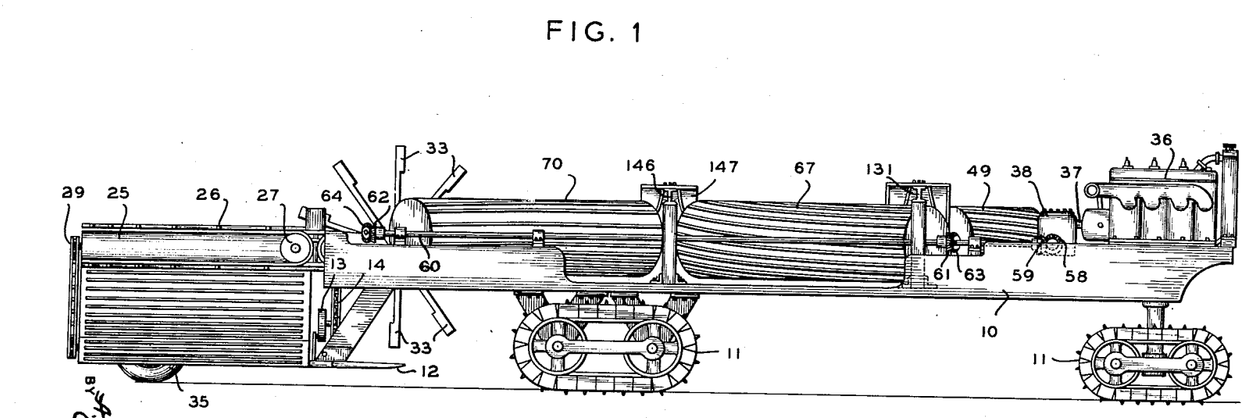
Fig. 1 is a side elevational view of a harvesting and decorticating apparatus for ramie, constructed in accordance with this invention.

With continued reference to the drawings, there is shown in Fig. 1 a harvesting and decorticating apparatus in accordance with this invention comprising a frame or chassis 10 mounted on Caterpillar tracks 11 or the like. The use of Caterpillar tracks or other relatively large ground engaging surfaces is necessary in order that the apparatus may be operated over swampy ground or the like, since in view of the necessary weight thereof were it not for such running gear, the machine would frequently become bogged down and useless. The apparatus as shown may be towed along the rows of ramie by any conventional caterpillar tractor or the like.

Figure 2:
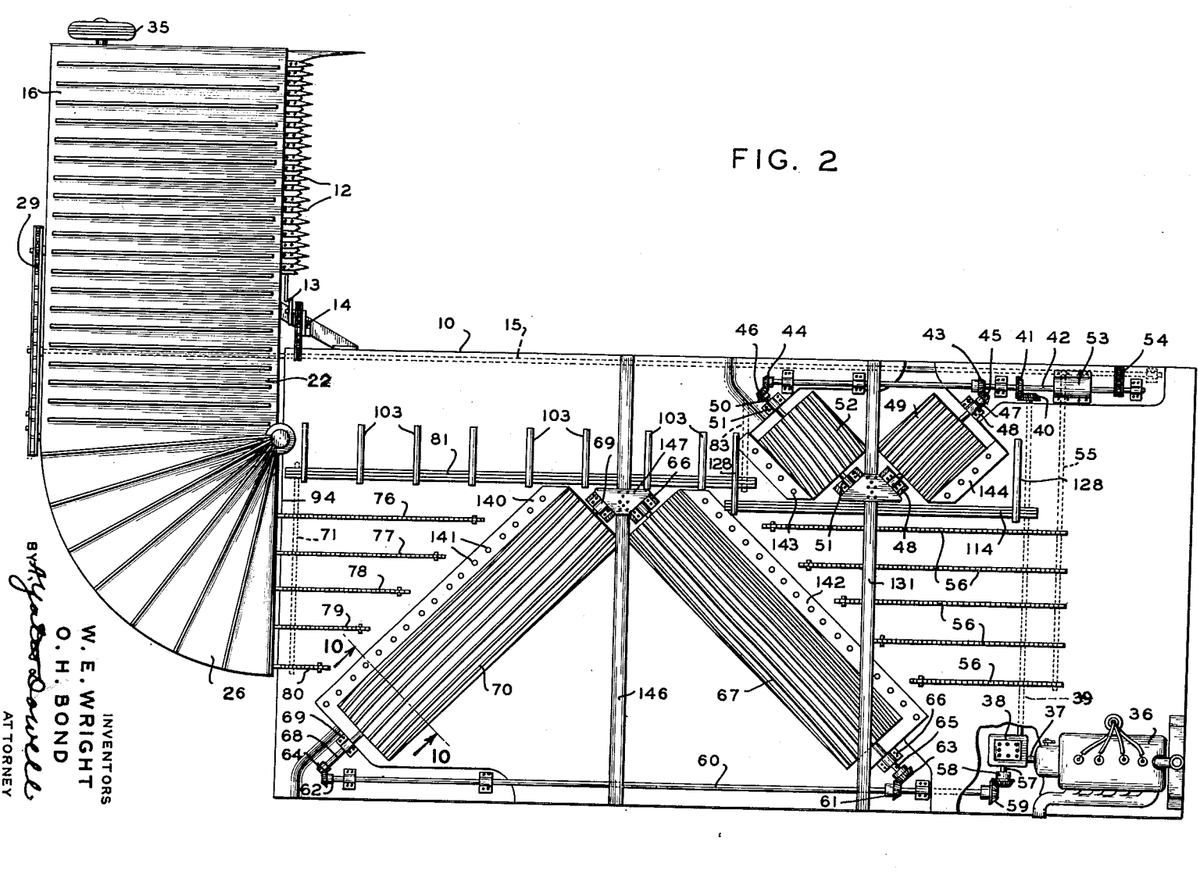
Fig. 2, a plan view of the apparatus of Fig. 1.
Figure 3:
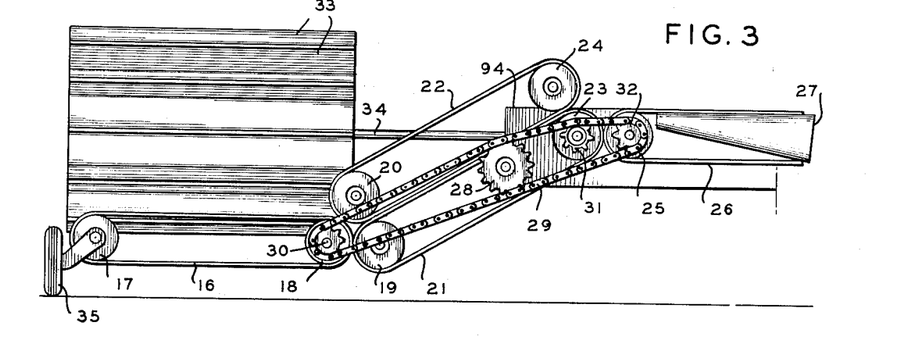
Fig. 3, a rear elevational view of the apparatus of Fig. 1 with certain parts omitted for greater clarity.
Figure 4:
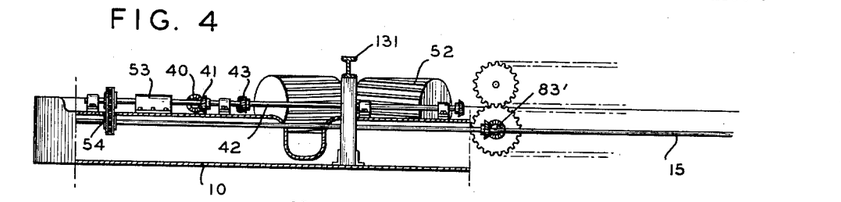
Fig. 4, a side elevational view showing the drive details and the like for the cleaning rollers for the butt end portions of the ramie stalks.

The harvesting feature of this apparatus is best shown in Figs. 1, 2 and 3 and is provided with a reciprocating cutter bar 12 similar to that used in the conventional mowing machine but of course designed to efficiently cut the ramie stalk, this cutter bar being driven from a crank and pitman 13 which receives its power through a chain 14 from a shaft 15 extending throughout the length of the machine. Immediately to the rear of the cutter bar 12 is a conveyor belt 16 which extends over pulleys 17 and 18. Adjacent the pulley 18 are two pulleys 19 and 20 over which conveyor belts 21 and 22 respectively are trained. Belts 21 and 22 are supported at their opposite ends by pulleys 23 and 24 respectively. Adjacent the pulley 23 is a cone shaped pulley 25 which receives a cone shaped belt 26. The opposite end of this belt is carried by cone shaped pulley 27.

Power for driving these conveyor belts is obtained from a sprocket 28 mounted on the end of shaft 15 and over which a chain 29 is trained, this chain engaging sprockets 30, 31 and 32 mounted on pulleys 18, 23 and 25 respectively.

In order to insure that the cut stalks will all fall in the same direction, there is provided a paddle wheel 33 shown in Figs. 1 and 3, mounted on a shaft 34 which is rotated through gearing on shaft 15. As will readily be seen, the rotating paddle wheel 33 will engage the ramie stalks just prior to their being cut and the paddles thereof will cause the ramie as it is cut to always fall in the same direction.

After cutting, the ramie stalks fall onto the conveyor 16 with the butt ends toward the front of the machine and the top ends toward the rear. The stalks are carried by conveyor 16 until they are engaged between the conveyor belts 21 and 22 to raise the stalks from slightly above ground level to the level of the decorticating apparatus. As the stalks are delivered from belts 21 and 22 they pass on to the conical belt 26 which serves to move the stalks from a position lengthwise of the apparatus to a position laterally thereof. A transfer device of this nature is necessary in order that the ramie stalks will be properly presented to the gripping and conveying means which carry them through the decorticating apparatus. In order to properly support the weight of the harvesting apparatus there is provided a wheel 35 which may be mounted outwardly therefrom or to the rear as the case may be.

In order to operate the decorticating and harvesting apparatus there is provided on the chassis 10 a power plant 36 which may conveniently take the form of a gasolene or diesel engine. Power is taken from this engine through a shaft 37 to a transmission 38 from which shaft 39 extends laterally across the machine. On the end of shaft 39 is a bevel gear 40 meshing with a bevel gear 41 on a shaft 42 extending longitudinally of the machine. Also mounted on shaft 42 are bevel gears 43 and 44 meshing with bevel gears 45 and 46 respectively. Gear 45 is mounted on a shaft 47 journalled in bearings 48 and serving to rotatably support a crushing or scraping roll 49. Gear 46 is mounted on shaft 50 journalled in bearings 51 and serving to rotatably support a second crushing or scraping roll 52. The opposite end of shaft 42 extends through a transmission 53 and at the opposite side of the transmission is mounted thereon a sprocket which engages a chain 54. This chain engages a sprocket on shaft 15 to provide driving power thereto.

Extending from the transmission 53 and at right angles to the shaft 42 is a shaft 55 carrying a plurality of sprockets over which are trained conveyor chains 56, these chains being supported at their opposite ends on freely rotating sprockets.

Extending from the transmission 38 is a stub shaft 57 on which is mounted a bevel gear 58 meshing with a bevel gear 59 on shaft 60 extending longitudinally of the machine. Also, mounted on shaft 60 are bevel gears 61 and 62 meshing with bevel gears 63 and 64 respectively. Gear 63 is mounted on shaft 65 journalled in bearings 66 and which serves to rotatably support a crushing or scraping roll 67. Gear 64 is mounted on a shaft 68 journalled in bearings 69 which serves to rotatably support crushing or scraping roll 70.

Figure 7:
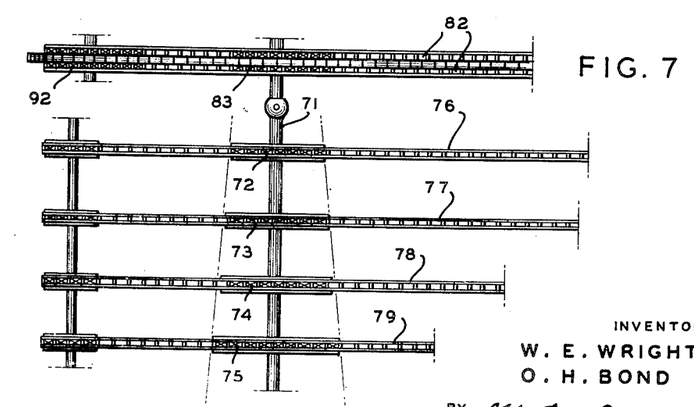
Fig. 7, a top plan view of additional conveyor chains at the entrance end of the machine and showing the arrangement whereby the top end of the stalk travels at a greater rate than the butt end.

A shaft 71 extends laterally of the machine at the feeding end thereof and adjacent the conical conveyor 26, shaft 71 carrying a plurality of sprockets 72, 73, 74 and 75 and as best shown in Fig. 7 these sprockets increase in size from 72 to 75. These sprockets engage conveyor chains 76, 77, 78, 79 respectively and another sprocket larger than sprocket 75 and not shown in Fig. 7 is mounted on shaft 71 and engages chain 80 to drive the same and as will be obvious, upon rotation of shaft 71 the chains will be moved at varying rates of speed, chain 76 running the slowest and chain 80 the fastest. The ends of these conveyor chains are trained over freely rotatable sprockets.

In order to grip the ramie stalks as they are delivered from conveyor 26 there is provided gripping means comprising a pair of upper and lower chains 81 and 82, these chains being trained over sprockets at either end thereof and receiving driving power from shaft 83' geared to shaft 15 through bevel gearing. Shaft 83' and chain 82 also provide driving power for shaft 71 on the end of which is mounted sprocket 83, which engages chain 82.

Figure 6:
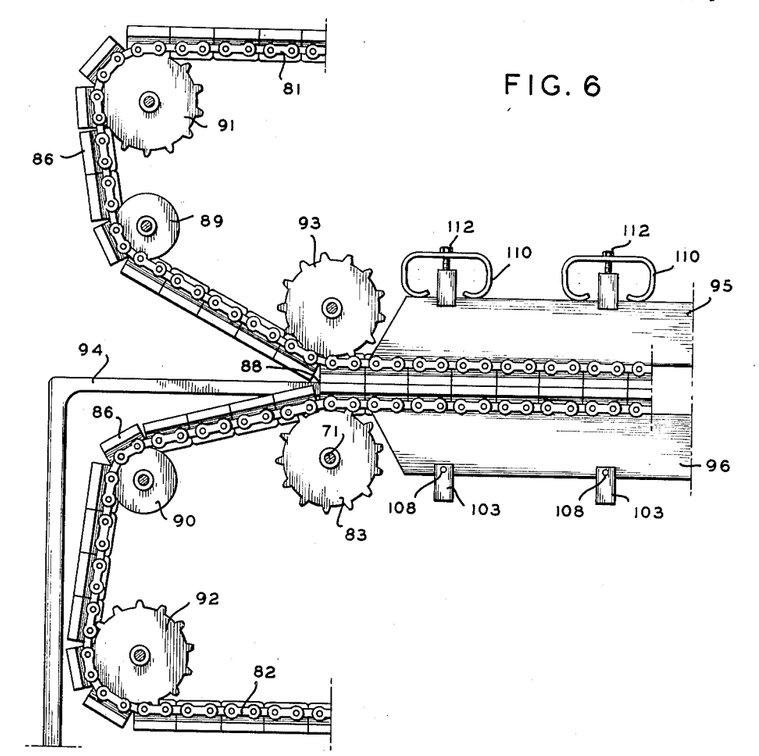
Fig. 6, a detailed side elevational view of the feeding chains for initially grasping the ramie stalks and pulling them through the machine, this view showing the chains just prior to closing upon a stalk.
Figures 13, 14, 15, 16:
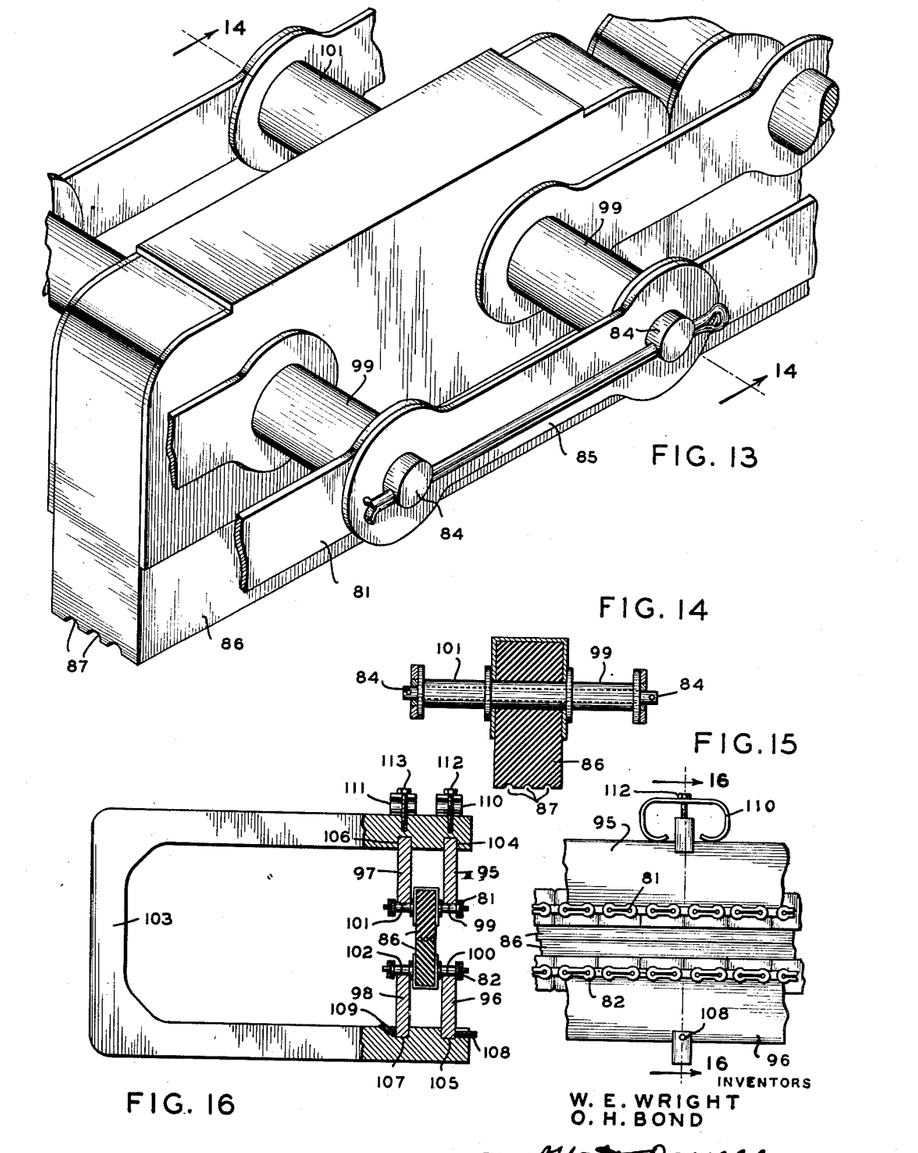

Chains 81 and 82 comprise a plurality of links pivoted together by pintle pins 84 and longitudinal side members 85, the details of which are best shown in Figs. 6, 13 and 14. These chains are provided with gripping blocks 86 formed of rubber or the like, the gripping surface thereof being provided with flutes 87 in order to more firmly grip the ramie stalks therebetween.

As best shown in Fig. 6, chains 81 and 82 come together at the feeding end of the machine adjacent the conveyor 26 and meet at a point on a level with this conveyor as shown at 88. In order that the entrance of the ramie stalks between the chains 81 and 82 will be easily effected and further in order that the stalks will not become engaged between adjacent blocks 86 on the same chain, there are provided rollers 89 and 90 mounted for rotation between sprockets 91 and 92 respectively. At the point of gripping chains 81 and 82 are also engaged by sprockets 93 and 83 respectively and as a result the chains between roller 89 and sprocket 93 and roller 90 and sprocket 83 run in a straight line at an angle to the feed table 94 which receives the ramie stalks from the conveyor 26. The chains 81 and 82 in this position thus form an opening in the nature of jaws which gradually close upon the ramie stalks as the chains progress towards the sprockets 93 and 83. As a consequence the stalks are gradually gripped therebetween and are firmly held by the flutes 87 in the blocks 86.

The chains 81 and 82 and their attached blocks 86 are held in engagement with the ramie stalks throughout the travel thereof by backing plates 95, 96, 97 and 98, which engage the chains at 99, 100, 101 and 102 respectively at each side of the blocks 86. The backing plates are received in C-shaped members 103 supported on the machine, the plates being slidably received in recesses 104, 105, 106 and 107. The lower plates 96 and 98 are locked in position in the slots 105 and 107 by set screws 108 and 109 respectively. The upper plates 95 and 97 are freely slidable in slots 104 and 106 respectively and are yieldably held in engagement with the upper surface of chain 81 by spring members 110 and 111 respectively, the tension of which is adjustable by means of screw threaded members 112 and 113 respectively.

The backing plates 95, 96, 97 and 98 extend throughout the length of travel of the chains 81 and 82 and as best shown in Fig. 2 a plurality of the C-shaped members 103 are provided in order to support and urge the plates into engagement with the chains at intervals throughout the length thereof.

It will thus be seen that there is provided by the above described structure a means for gripping and pulling stalks of ramie through the machine, which means will not become clogged during operation and which will grip the ramie stalks firmly but without injury thereto.

A second gripping and pulling means similar to that described above is provided for gripping the stalk of ramie after the upper part thereof has been cleaned and serves to pull the butt end of the stalk through means for cleaning this portion. This second gripping means is located to receive the stalks as they are released from the first described gripping and pulling means and is arranged to engage the stalk at a point in the cleaned portion thereof.

Figures 8, 9:
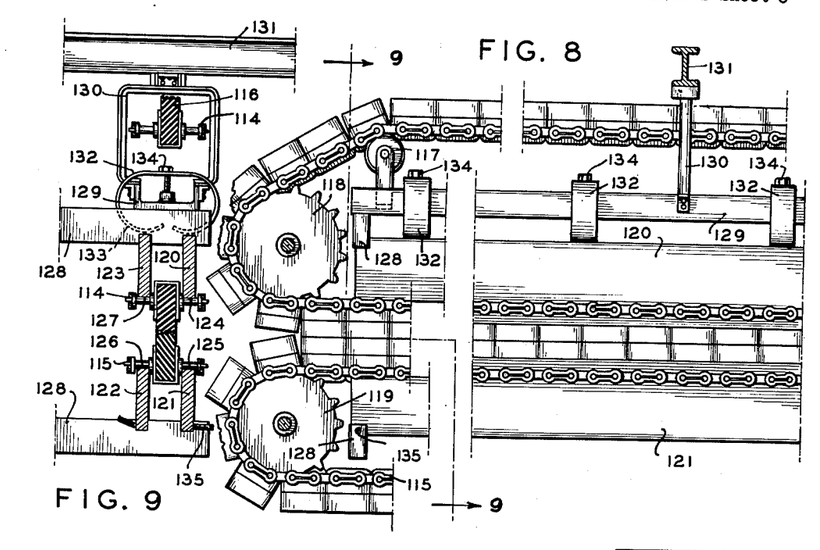
Fig. 8, a side elevational view similar to Fig. 6 but showing the details of the chains for gripping the ramie stalks during cleaning of the butt end portions thereof.
Fig. 9, an elevational view in section taken on the line 9—9 of Fig. 8.

The second gripping means comprises a pair of chains 114 and 115 constructed similarly to chains 81 and 82 and being provided with resilient gripper blocks 116. Adjacent the entrance to the second gripping means, the chain 114 passes over a roller 117 and a sprocket 118. The chain 115 merely passes over sprocket 119 and the opposite ends of these chains pass over sprockets which receive driving power from shaft 15.

In order to hold the blocks 116 carried by chains 114 and 115 in engagement throughout the length of travel thereof, there are provided backing plates 120, 121, 122 and 123 adapted to engage the chain links at 124, 125, 126 and 127 respectively. The upper plates 120 and 123 are slidably supported in one leg of C-shaped members 128, members 128 in turn being secured to a channel bar 129 which extends throughout the length of the backing plates. Channel bar 129 is supported by a U-shaped member 130 which in turn is secured to an I beam 131 extending laterally of the machine. In order to yieldably hold the plates 120 and 123 in engagement with the chain 114 there are provided a plurality of spring means 132, the ends 133 of which bear against the top surfaces of the plates 120 and 123. Screw threaded means 134 is provided in order to adjust the tension of the springs 132. Plates 121 and 122 are fixed in the opposite legs of the C-shaped members 128, these plates being clamped in position by means of set screws 135. It is not necessary that plates 121 and 122 be allowed to move, since all yielding motion necessary to accommodate the stalks of ramie between the blocks 116 is accomplished through movement of the upper pressure plates 120 and 123.

As best shown in Fig. 2, it will be noted that the second gripping and pulling means 114 is spaced laterally from the first gripping means 81 and this will grip the stalk at a point removed from that at which the stalk was gripped by chain 81 and consequently the portion gripped by chain 81 will be exposed to the action of scraping rolls 49 and 52.

In order to properly clean the ramie fiber there are provided two pairs of scraping rolls, rolls 70 and 67 being provided for cleaning the major top portion of the stalk while rolls 52 and 49 are provided for cleaning the butt end portion of the stalk. These rolls are intended to rotate at a speed of approximately 600 to 700 R. P. M. and are provided with knife blades throughout the circumference thereof, which engage and scrape the unwanted material from the ramie fiber as the stalk passes between a stationary blade and the knives of the roll. The rolls are similarly constructed except for the fact that the knives are arranged spirally on each roll and the direction of this spiral depends on the direction of rotation of the roll, the purpose of which will presently be more fully explained.

Figure 10:
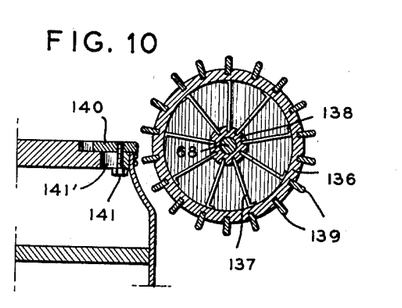
Fig. 10, an elevational view in section taken on the line 10—10 of Fig. 2.

As best shown in Fig. 10, the rolls may conveniently take the form of a hollow cylindrical shell 136 having spoke members 137 connecting the shell with a hub 138 fixed on shaft 68 which is journalled in bearings to rotatably support the roll. Mounted on the circumference of the shell are knife blades 139 and these blades extend throughout the length of the shell.

Located adjacent the roll 70 is a fixed knife blade 140 (Fig. 10) which may be locked in adjusted position relative to the roll by means of screw threaded bolts 141 extending through elongated slots 141' in the frame and threaded into the knife blade 140. The knife blade 140 is adjusted in such manner that the clearance between this blade and the blades 139 on the roll varies from one end to the other, the clearance at the inner end of the roll being approximately .030 inch and at the outer end of the roll approximately .020 inch. This variation in clearance is necessary due to the change in diameter from the butt end to the top of the stalk. Fixed knife blades 142, 143 and 144 are also provided adjacent the rolls 67, 52 and 49 respectively.

Roll 70 is adapted to rotate in a counter clockwise direction when viewed from the driven end thereof and roll 67 rotates clockwise when viewed from the driven end. Roll 52 rotates clockwise when viewed from the driven end and roll 49 counterclockwise. For this reason the spiral formation of the knife blades 139 must be in accordance with the direction of rotation for that particular roll. The knives on roll 70 are given a left hand twist when viewed from the driven end while the knives on roll 67 are given a right hand twist, the knives on roll 52 having right hand twist and the knives on roll 49 a left hand twist.

The purpose of the spiral arrangement of the knives on the rolls is two-fold. First, by making the amount of twist over the length of each roll approximately the distance between knife blades, the ramie stalk is at all times engaged between some portion of one rotating blade and the stationary blade 140. Consequently, as each blade comes into engagement with the ramie stalk there is no jar or excessive vibration since a preceding blade is still in engagement with a preceding stalk and therefore there is a steady load on the roll and not a series of impacts as there would be if the rotating blades were not spirally arranged. Secondly, the spiral arrangement is such that the stalks tend to be pulled away from the gripping or pulling means 81 and 114 and consequently the stalks are cleaned by the whole length of the roll rather than all tending to bunch together at one portion thereof, this action making it necessary for the gripping and pulling means 81 and 114 to pull the stalks lengthwise of the stationary knife 140 rather than the stalks tending to become bunched at the inner end of the roll as would be the case if the twist were in the opposite direction.

Figure 5:
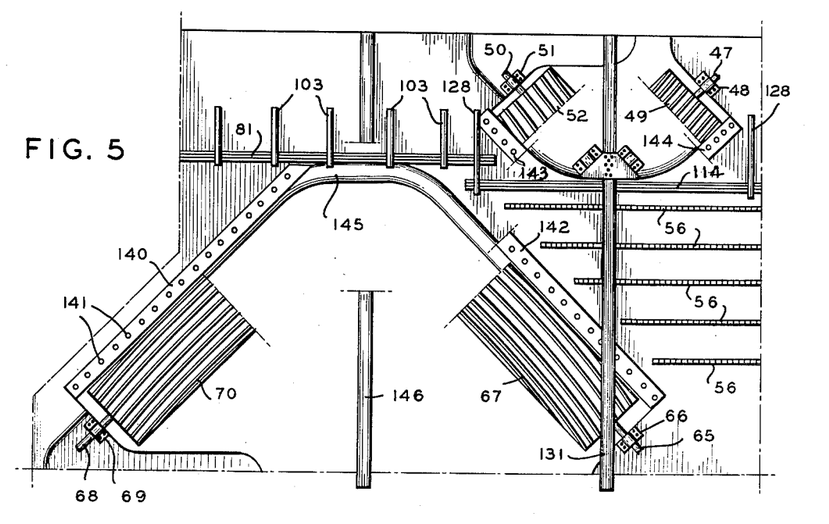
Fig. 5, a top plan view of the apparatus adjacent the cleaning rolls and with parts broken away for greater clarity.

The space beneath the cleaning rolls is left open so that the material removed from the ramie stalks will simply fall onto the ground and it is therefore not necessary to provide any means for removing this material from the machine. In order that the ramie stalks after being cleaned by roll 70 may properly pass into engagement with the fixed knife 142 and roll 67, there is provided at the inner ends of these rolls a guide means, best shown in Figs. 5 and 11, and comprising a sheet metal stamping 145 or the like which serves to guide the stalks as they leave roll 70 around to the opening between knife 142 and roll 67. The action of this guide will be clearly seen from an inspection of Fig. 5 wherein the guide 145 is shown as extending from just below the end of knife blade 140 to just below the entrance between knife blade 142 and roll 67.

Figure 11:
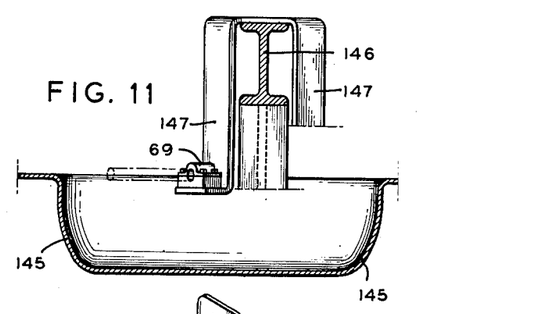
Fig. 11, a detailed elevational view with parts in section for greater clarity and showing the means for mounting the cleaning rollers.
Figure 12:
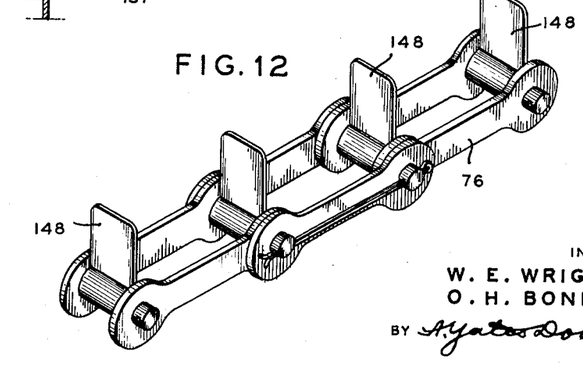
Fig. 12, a perspective view of one of the conveyor chains of Fig. 7.

In order that the ramie stalk may pass below the inner ends of the rolls 70 and 67 in moving from one roll to the other, it is necessary that the bearings 66 and 69 supporting the inner ends of these rolls be mounted from above and as shown in Figs. 1, 2 and 11, and this is accomplished by providing an I beam 146 extending transversely of the machine to which is secured an angle bracket 147. The lower end of bracket 147 is provided with means for supporting bearings 66 and 69, thus leaving the portion thereebeneath free for passage of the ramie stalks.

In operation the machine is towed along the rows of ramie in the field by a tractor or the like and as it moves along ramie stalks are cut by the cutter bar 12, the stalks falling onto conveyor 16 all laying in the same direction under the action of paddles 33. The stalks are carried along conveyor 16 to conveyor 21 on which they are carried upwardly to the level of the feeding table 94 where they are delivered to the conical conveyor 26 which moves the stalks from a position lengthwise of the machine to a position laterally thereof and onto the feeding table 94.

At this point the stalks are engaged near the butt ends thereof between the blocks 86 of chains 81 and 82 and at the same time the remaining portion of the stalk is engaged by upstanding ears 148 on conveyor chains 76, 77, 78, 79 and 80.

As the stalks progress toward the roll 70 and stationary knife 140 the portion thereof engaged by chain 76 will move slightly faster than the portion gripped between chains 81 and 82 and the portions engaged by chains 77, 78, 79 and 80 will move progressively faster due to the increased size of the driving sprockets as shown in Fig. 7 with the top end engaged by chain 80 moving at the fastest rate. As the top end of the stalk comes in contact with the revolving roll 70, the stalk is carried down between knife 140 and the knife blades 139 on the roll 70 and a scraping action takes place which cleans the undesired material therefrom. In view of the fact that the top portion of the stalk moves progressively faster than the butt portion, the stalk will be maintained substantially at right angles to the axis of the roll 70, which allows a more thorough cleaning action and prevents undue bending of the stalk which might tend to cause breakage thereof.

As the stalk progresses between the cleaning roll 70 and the knife 140, the butt end portion is being carried along by gripping means 81 and 82 until the end of knife 140 is reached, at which time the partially clean stalk will be carried away from the roll 70 and guided by means 145 will engage between roll 67 and knife 142, after which the stalk will be pulled upwardly to further clean the same. Shortly after engagement between knife 142 and roll 67 the butt end portion will be released from gripping means 81 and another portion of the stalk will be engaged by gripping and pulling means 114 and 115 which will continue to pull the stalk between knife 142 and roll 67 to complete the cleaning of the major top portion of the stalk.

Shortly after engagement of the stalk by gripping means 114 and 115 the butt end portion will engage scraping roll 52 and will be carried downwardly between this roll and knife 143 to perform the initial cleaning operation on the butt end portion. As this portion leaves roll 52 and knife 143 it will be carried forward and under the action of guide means similar to 145 will be directed into engagement between knife 144 and roll 49 which will complete the cleaning of the butt end portion.

As the major portion of the stalk leaves knife 142 and roll 67 it is progressively engaged by conveyor chains 56 which carry the cleaned fiber forwardly of the machine and after the fiber is released by gripping means 114 and 115 it may be disposed of by other conveyor means or may be loaded manually onto a truck or other vehicle.

It will thus be seen that there is provided by this invention a relatively simple harvesting and decorticating apparatus which is adapted to be operated in the climate and under the soil conditions in which ramie must be grown and in which the ramie is cut and immediately cleaned in order to produce the greatest possible percentage of commercially usable fiber. It also appears clear that there has been provided an apparatus which requires practically no manual labor, the only such labor necessary being that to remove the cleaned fiber from the machine, and this obviously can be of the unskilled variety.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A decorticator for ramie comprising in combination a chassis, running gear on said chassis, conveyor means constructed and arranged to convey ramie stalks to a feeding table on said chassis, a pair of rotatable scraping rolls mounted at right angles to each other in the path of movement of the upper portions of said stalks, stationary knives adjacent each roll and cooperating therewith to scrape bark and other unwanted material from said stalks, a second pair of scraping rolls rotatably mounted at right angles to each other, said second pair of rolls being spaced laterally and longitudinally from said first pair of rolls, a stationary knife adjacent each roll of said second pair and cooperating therewith to scrape bark and other unwanted material from the butt end portions of said stalks, means for adjusting said knives toward and away from said rolls with the clearance between said stationary knives and the blades on each roll varying from one end to the other in order to accommodate the varying diameter of said stalks from butt end to tip, gripping and pulling means extending longitudinally of said chassis from a point adjacent said feeding table to a point adjacent said second pair of rolls, said gripping means being constructed and arranged to grip said stalks adjacent the butt ends thereof and to pull the upper portions of said stalks between the stationary knives and rolls of said first pair, conveyor means adjacent said gripping and pulling means and cooperating therewith to feed said stalks to said first pair of rolls, a second gripping and pulling means spaced laterally from said first gripping and pulling means and extending longitudinally of said chassis from a point adjacent the end of said first gripping and pulling means to a point of discharge, said second gripping and pulling means being constructed and arranged to engage said stalks upon release by said first gripping and pulling means at a point laterally removed from the point of first engagement and to pull the butt end portions of said stalks between the stationary knives and rolls of said second pair of rolls to clean the butt end portions thereof, conveyor means adjacent said second gripping and pulling means and cooperating therewith to discharge the cleaned stalks from the apparatus and power means on said chassis constructed and arranged to operate said gripping and pulling means and said cleaning means.

2. In a harvester and a decorticator for ramie including in combination a chassis, running gear on said chassis, harvesting means mounted on said chassis for movement therewith and including ramie cutting means, conveyor means constructed and arranged to convey cut ramie stalks from said cutting means to a feeding table on said chassis, the improvement comprising a pair of rotatable scraping rolls mounted at approximately right angles to each other in the path of movement of the upper portions of said stalks, stationary knives adjacent each roll and cooperating therewith to scrape bark and other unwanted material from said stalks, a second pair of scraping rolls rotatably mounted at approximately right angles to each other, said second pair of rolls being spaced laterally and longitudinally from said first pair of rolls, a stationary knife adjacent each roll of said second pair and cooperating therewith to scrape bark and other unwanted material from the butt end portions of said stalks, means for adjusting said knives toward and away from said rolls with the clearance between said stationary knives and the blades on each roll varying from one end to the other in order to accommodate the varying diameter of said stalks from butt end to tip, gripping and pulling means extending longitudinally of said chassis from a point adjacent said feeding table to a point adjacent said second pair of rolls, said gripping means being constructed and arranged to grip said stalks adjacent the butt ends thereof and to pull the upper portions of said stalks between the stationary knives and rollers of said first pair, conveyor means adjacent said gripping and pulling means and cooperating therewith to feed said stalks to said first pair of rolls, a second gripping and pulling means spaced laterally from said first gripping and pulling means and extending longitudinally of said chassis from a point adjacent the end of said first gripping and pulling means to a point of discharge, said second gripping and pulling means being constructed and arranged to engage said stalks upon release by said first gripping and pulling means at a point laterally removed from the point of first engagement and to pull the butt end portions of said stalks between the stationary knives and rolls of said second pair of rolls to clean the butt end portions thereof, conveyor means adjacent said second gripping and pulling means and cooperating therewith to discharge the clean stalks from the apparatus, and power means on said chassis constructed and arranged to operate said harvesting means, gripping and pulling means and said cleaning means.

3. A decorticator for ramie comprising in combination a chassis, running gear on said chassis, conveyor means constructed and arranged to convey ramie stalks to a feeding table on said chassis, means on said chassis for cleaning the upper portions of said stalks, a second means on said chassis for cleaning the butt end portions of said stalks, said cleaning means comprising rotatably mounted rolls each roll having a plurality of blades on the circumference thereof, said blades being spirally arranged throughout the length of said roll, the twist of said spiral being substantially equal to the distance between adjacent blades, a stationary blade adjustably mounted adjacent each roll with the clearance between said stationary blade and the blades on said roll varying from one end thereof to the other in order to accommodate the varying diameter of said stalks from butt end to tip, the spiral arrangement of said rotating blades resulting in one blade always being in engagement with a stalk, thus minimizing jar and vibration, gripping means for engaging said stalks adjacent the butt ends thereof and for pulling the upper portions of said stalks through said first cleaning means, a plurality of conveyors arranged in side by side relationship and running parallel to said gripping means from a point adjacent said feeding table to a point adjacent said first mentioned cleaning means, said conveyors being constructed and arranged to travel at progressively increasing rates of speed from the conveyor nearest the gripping means to the conveyor farthest removed therefrom whereby the top of the stalks will be fed toward said first cleaning means at a faster rate than portions of the stalks nearer the butt end whereby said stalks will be fed to said first cleaning means at substantially right angles thereto and without excessive bending of said stalks, thus minimizing breakage of fibers, a second gripping means for engaging said stalks at a point removed from the point of said first engagement and for pulling said butt end portions through said second cleaning means and power means on said chassis constructed and arranged to operate said gripping and pulling means and said cleaning means.

4. A harvester and decorticator for ramie comprising in combination a chassis, conveyor means constructed and arranged to convey ramie stalks to a feeding table on said chassis, means on said chassis for cleaning the upper portions of said stalks, a second means on said chassis for cleaning the butt end portions of said stalks, said cleaning means comprising rotatably mounted rolls each roll having a plurality of blades on the circumference thereof, said blades being spirally arranged throughout the length of said roll, the twist of said spiral being substantially equal to the distance between adjacent blades, a stationary blade adjustably mounted adjacent each roll with the clearance between said stationary blade and the blades on said roll varying from one end thereof to the other in order to accommodate the varying diameter of said stalks from butt end to tip, the spiral arrangement of said rotating blades resulting in one blade always being in engagement with a stalk thus minimizing jar and vibration, gripping means for engaging said stalks adjacent the butt ends thereof and for pulling the upper portions of said stalks through said first cleaning means, a second gripping means for engaging said stalks at a point removed from the point of said first engagement and for pulling said butt end portions through said second cleaning means and power means on said chassis constructed and arranged to operate said gripping and pulling means and said cleaning means.

5. In a harvester and decorticator for ramie including in combination a chassis, running gear on said chassis, harvesting means mounted on said chassis for movement therewith and including ramie cutting means, conveyor means constructed and arranged to convey cut ramie stalks from said cutting means to a feeding table on said chassis, the improvement comprising means on said chassis for cleaning the upper portions of said stalks, a second means on said chassis for cleaning the butt end portions of said stalks, said cleaning means comprising rotatably mounted rolls each roll having a plurality of blades on the circumference thereof, said blades being spirally arranged throughout the length of said roll the twist of said spiral being substantially equal to the distance between adjacent blades, a stationary blade adjustably mounted adjacent each roll with the clearance between said stationary blade and the blades on said roll varying from one end thereof to the other in order to accommodate the varying diameter of said stalks from butt end to tip, the spiral arrangement of said rotating blades resulting in one blade always being in engagement with a stalk thus minimizing jar and vibration, gripping means for engaging said stalks adjacent the butt ends thereof and for pulling the upper portions of said stalks through said first cleaning means, a second gripping means for engaging said stalks at a point removed from the point of said first engagement and for pulling said butt end portions through said second cleaning means and power means on said chassis constructed and arranged to operate said harvesting means, said gripping and pulling means and said cleaning means.

6. A harvester and decorticator for ramie comprising in combination a chassis, conveyor means constructed and arranged to convey ramie stalks to a feeding table on said chassis, means on said chassis for cleaning the upper portions of said stalks, a second means on said chassis for cleaning the butt end portions of said stalks, said cleaning means comprising rotatably mounted rolls, each roll having a plurality of blades on the circumference thereof, said blades being spirally arranged throughout the length of said roll, the twist of said spiral being substantially equal to the distance between adjacent blades, a stationary blade mounted on said chassis for cooperation with each of said rolls, the spiral arrangement of said rotating blades resulting in one blade always being in engagement with a stalk, thus minimizing jar and vibration, gripping means for engaging said stalks adjacent the butt ends thereof and for pulling the upper ends of said stalks through said first cleaning means, a second gripping means for engaging said stalks at a point removed from the point of said first engagement and for pulling said butt end portions through said second cleaning means, and power means on said chassis constructed and arranged to operate said gripping and pulling means and said cleaning means.

7. A harvester and decorticator for ramie comprising in combination a chassis, conveyor means constructed and arranged to convey ramie stalks to a feeding table on said chassis, means on said chassis for cleaning the upper portions of said stalks, a second means on said chassis for cleaning the butt ends of said stalks, said cleaning means comprising rotatably mounted rolls, each roll having a plurality of blades on the circumference thereof, a stationary blade adjustably mounted adjacent each roll with the clearance between said stationary blade and the blades of at least one of said rolls increasing from the entrance end thereof to the exit end thereof in order to accommodate the varying diameters of said stalks from butt end to tip, gripping means for engaging said stalks adjacent the butt ends thereof and for pulling the upper portions of said stalks through said first cleaning means, a second gripping means for engaging said stalks at a point removed from the point of said first engagement and for pulling said butt end portions through said second cleaning means, and power means on said chassis constructed and arranged to operate said gripping and pulling means and said cleaning means.

References Cited in the file of this patent

UNITED STATES PATENTS

| Number | Name | Date |
|---|---|---|
| 328,357 | Stephens | Oct. 13, 1885 |
| 362,387 | Kauffman et al. | May 3, 1887 |
| 824,243 | Hollier | June 26, 1906 |
| 1,010,006 | Worth | Nov. 28, 1911 |
| 1,317,325 | Shely | Sept. 30, 1919 |
| 1,718,587 | Selvig | June 25, 1929 |
| 2,078,419 | Selvig | Apr. 27, 1937 |
| 2,443,296 | Brereton | June 15, 1948 |
| 2,551,128 | Hulfish et al. | May 1, 1951 |